(12) United States Patent
Maezawa et al.

(10) Patent No.: US 10,096,307 B2
(45) Date of Patent: Oct. 9, 2018

(54) AUTOMATIC PERFORMANCE SYSTEM, AUTOMATIC PERFORMANCE METHOD, AND SIGN ACTION LEARNING METHOD

(71) Applicant: YAMAHA CORPORATION, Hamamatsu-shi (JP)

(72) Inventors: Akira Maezawa, Hamamatsu (JP); Kazuhiko Yamamoto, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/597,675

(22) Filed: May 17, 2017

(65) Prior Publication Data
US 2017/0337910 A1 Nov. 23, 2017

(30) Foreign Application Priority Data
May 18, 2016 (JP) .................. 2016-099642

(51) Int. Cl.
G04B 13/00 (2006.01)
G10H 1/00 (2006.01)
G10H 1/36 (2006.01)

(52) U.S. Cl.
CPC .......... G10H 1/0008 (2013.01); G10H 1/36 (2013.01); G10H 2210/076 (2013.01);
(Continued)

(58) Field of Classification Search
CPC .. H04K 1/00; G10H 2210/091; G10H 1/0008; G10H 2240/175; G10H 2220/206; G10H 1/36; G10H 2210/105
See application file for complete search history.

(56) References Cited

U.S. PATENT DOCUMENTS 5,913,259 A 6/1999 Grubb et al.
5,952,597 A * 9/1999 Weinstock ............... G10G 3/04
84/477 R
(Continued)

FOREIGN PATENT DOCUMENTS

EP 2919228 A1 9/2015
JP S57124396 A 8/1982
(Continued)

OTHER PUBLICATIONS

International Search Report issued in Intl. Appln. No. PCT/JP2015/082514 dated Feb. 2, 2016. English translation provided.
(Continued)

Primary Examiner — Marlon Fletcher
(74) Attorney, Agent, or Firm — Rossi, Kimms & McDowell LLP (57) ABSTRACT

An automatic performance system includes a sign detector configured to detect a sign action of a performer performing a musical piece, a performance analyzer configured to sequentially estimates a performance position in the musical piece by analyzing an acoustic signal representing performed sound in parallel with the performance, and a performance controller configured to control an automatic performance device to carry out an automatic performance of the musical piece so that the automatic performance is synchronized with the sign action detected by the sign detector and a progress of the performance position estimated by the performance analyzer.

18 Claims, 6 Drawing Sheets

(52) U.S. Cl.
CPC . *G10H 2210/091* (2013.01); *G10H 2220/121* (2013.01); *G10H 2220/201* (2013.01); *G10H 2220/455* (2013.01); *G10H 2240/325* (2013.01)

(56) References Cited

U.S. PATENT DOCUMENTS

| | | | |
|---|---|---|---|
| 8,838,835 B2 | 9/2014 | Hara | |
| 2001/0023635 A1 | 9/2001 | Taruguchi et al. | |
| 2002/0118562 A1 | 8/2002 | Hiratsuka | |
| 2011/0003638 A1* | 1/2011 | Lee | G09B 15/00 463/35 |
| 2015/0206441 A1* | 7/2015 | Brown | G09B 5/00 434/308 |
| 2017/0018262 A1 | 1/2017 | Piñuela Irrisarri et al. | |
| 2017/0220855 A1* | 8/2017 | Bose | G06K 9/00295 |
| 2017/0230651 A1* | 8/2017 | Bose | H04N 17/002 |
| 2017/0256246 A1 | 9/2017 | Maezawa et al. | |
| 2017/0294134 A1* | 10/2017 | Angel | G09B 7/06 |

FOREIGN PATENT DOCUMENTS

| | | |
|---|---|---|
| JP | H03253898 A | 11/1991 |
| JP | 2007279490 A | 10/2007 |
| JP | 2011242560 A | 12/2011 |
| JP | 2015079183 A | 4/2015 |
| WO | 9916048 A1 | 4/1999 |
| WO | 2005022509 A1 | 3/2005 |

OTHER PUBLICATIONS

Written Opinion issued in Intl. Appln. No. PCT/JP2015/082514 dated Feb. 2, 2016. English translation provided.

International Preliminary Report on Patentability issued in Intl. Appln. No. PCT/JP2015/082514 dated May 23, 2017. English translation provided.

Maezawa et al. "Non-Score-Based Music Parts Mixture Audio Alignment." Information Processing Society of Japan. SIG Technical Report. Sep. 1, 2013: 1-6. vol. 2013-MUS-100, No. 14. English abstract provided.

Maezawa et al. "Inter-Acoustic-Signal Alignment Based on Latent Common Structure Model." Information Processing Society of Japan. SIG Technical Report. May 24, 2014: 1-6. vol. 2014-MUS-103, No. 23. English abstract provided.

Shirogane et al. "Description and Verification of an Automatic Accompaniment System by a Virtual Text with Rendezvous." Information Processing Society of Japan. Mar. 15, 1995: 1-369-1-370. English translation of NPL 1, NPL 2, and NPL 3 provided.

Inoue et al. "Adaptive Automated Accompaniment System for Human Singing." Transactions of Information Processing Society of Japan. Jan. 15, 1996: 31-38. vol. 37, No. 1. English abstract provided. English translation of NPL 1, NPL 2, and NPL 3 provided.

Extended European Search Report issued in European Application No. 15861046.9 dated Apr. 10, 2018.

\* cited by examiner

AUTOMATIC PERFORMANCE SYSTEM, AUTOMATIC PERFORMANCE METHOD, AND SIGN ACTION LEARNING METHOD

CROSS REFERENCE TO RELATED APPLICATIONS

This application is based on Japanese Patent Application (No. 2016-099642) filed on May 18, 2016, the contents of which are incorporated herein by reference.

BACKGROUND OF THE INVENTION

1. Field of the Invention

The present disclosure relates to automatic performance.

2. Description of the Related Art

A score alignment technology has been proposed in which the position (hereafter referred to as "performance position") in a musical piece being currently performed is estimated by analyzing the sound generated by the performance of the musical piece (for example, JP-A-2015-79183).

On the other hand, an automatic performance technology for generating sound from a musical instrument, such as a keyboard musical instrument, using musical piece data representing the performance contents of a musical piece has become wide-spread. Automatic performance in synchronization with performance by a performer can be achieved by applying the analysis results of the position of the performance to the automatic performance. However, in the case that the automatic performance is just made to simply follow the performance of a musical instrument, it is difficult to reproduce the trend of an actual ensemble where a plurality of performers carries out the performance of a musical piece while mutually recognizing their behaviors.

SUMMARY

In consideration of the above-mentioned circumstances, the present disclosure is intended to improve the naturalness of an ensemble including performance by performers and automatic performance by an automatic performance device.

In order to solve the above-mentioned problem, there is provided an automatic performance system comprising:

a sign detector configured to detect a sign action of a performer performing a musical piece;

a performance analyzer configured to sequentially estimates a performance position in the musical piece by analyzing an acoustic signal representing performed sound in parallel with the performance; and a performance controller configured to control an automatic performance device to carry out an automatic performance of the musical piece so that the automatic performance is synchronized with the sign action detected by the sign detector and a progress of the performance position estimated by the performance analyzer.

Also, there is provided an automatic performance method comprising:

detecting a sign action of a performer performing a musical piece;

sequentially estimating a performance position in the musical piece by analyzing an acoustic signal representing performed sound in parallel with the performance; and controlling an automatic performance device to carry out an automatic performance of the musical piece so that the automatic performance is synchronized with the sign action and a progress of the performance position.

Further, there is provided a sign action learning method performed by data processing apparatus, the sign action learning method comprising:

receiving image signals, each received image signal representing an image of a performer, imaged by an imaging device;

extracting feature amounts from the images in the image signals;

carrying out a machine learning of an identification model by using the feature amounts as learning data; and detecting a sign action of a performer actually performing a musical piece with automatic performance by applying a feature amount extracted from an image signal of the performer actually performing the musical piece imaged by the imaging device to the identification model obtained after the machine learning.

DETAILED DESCRIPTION OF THE EXEMPLARY EMBODIMENTS

Figure 1:
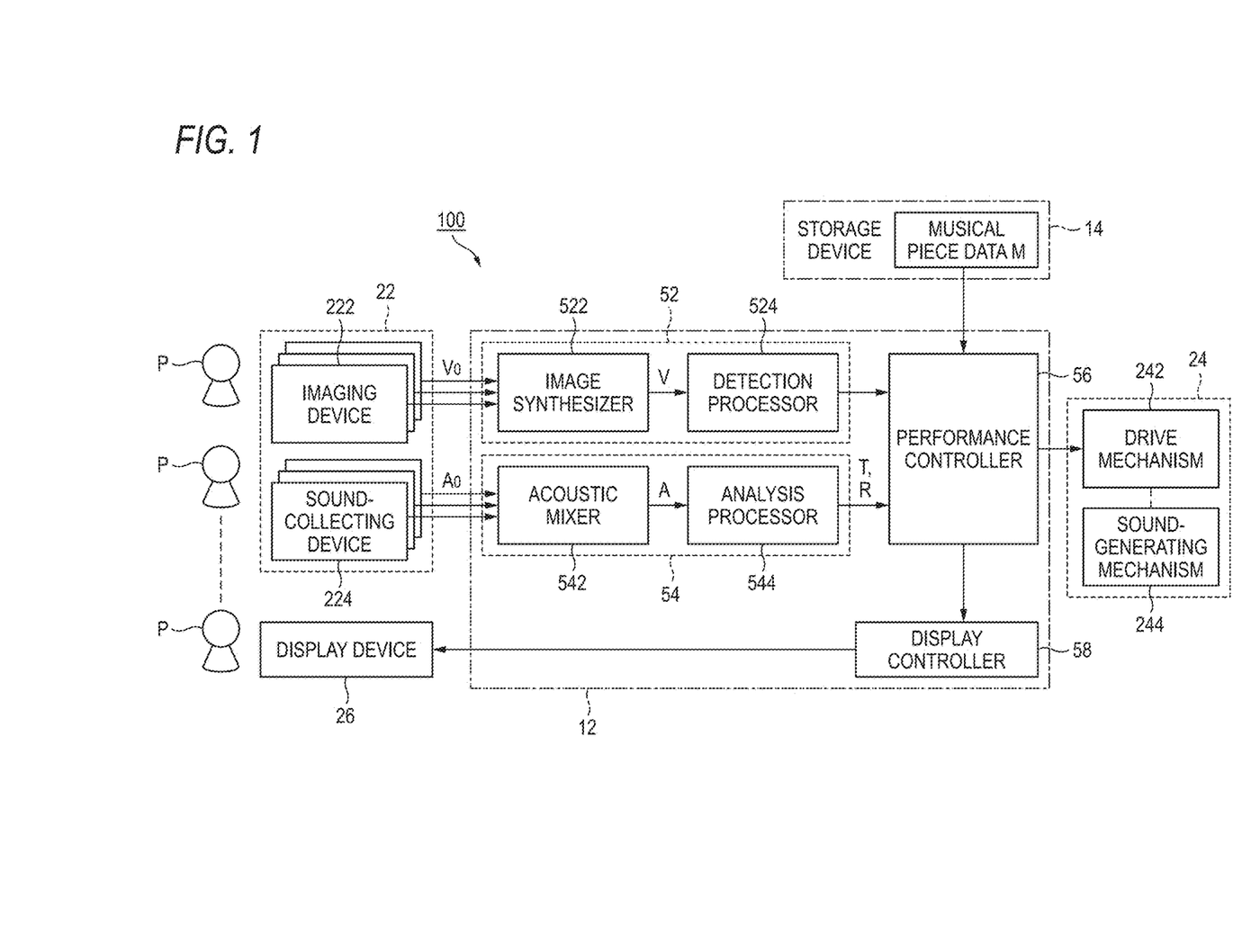
FIG. 1 is a configuration diagram showing an automatic performance system according to an embodiment of the present disclosure.

FIG. 1 is a configuration diagram showing an automatic performance system 100 according to an embodiment of the present disclosure. The automatic performance system 100 is a computer system installed in a space, such as an acoustic hall, in which a plurality of performers P plays musical instruments, and in parallel with the performance of a musical piece (hereafter referred to as "target musical piece") by the plurality of performers P, the automatic performance system 100 carries out the automatic performance of the target musical piece. Although the performers P are typically the performers of musical instruments, they may be singers of the target musical piece. In other words, "performance" in this application includes not only the performance of musical instruments but also singing. In addition, persons not actually carrying out the performance of musical instruments (for example, conductors during concerts and acoustic directors during recording sessions) can be included in the performers P.

As shown in FIG. 1, the automatic performance system 100 according to this embodiment includes a control device 12, a storage device 14, a recording device 22, an automatic performance device 24 and a display device 26. The control device 12 and the storage device 14 are achieved by an information processing device, such as a personal computer.

The control device 12 is a processing circuit, such as a CPU (central processing unit) and totally controls the respective components of the automatic performance system 100. The storage device 14 is configured by a known recording medium, such as a magnetic recording medium or a semiconductor recording medium, or a combination of a plurality of kinds of recording media, and is used to store programs to be executed by the control device 12 and various kinds of data to be used by the control device 12. However, it is possible that the storage device 14 (for example, cloud storage) separated from the automatic performance system 100 is prepared and that the control device 12 carries out writing and reading operations for the storage device 14 via a communication network, such as a mobile communication network or the Internet. In other words, the storage device 14 can be omitted from the automatic performance system 100.

The storage device 14 according to the embodiment stores musical piece data M. The musical piece data M specifies the performance contents of the target musical piece to be performed automatically. For example, a file (SMF: Standard MIDI File) conforming to the MIDI (Musical Instrument Digital Interface) Standard is suitable as the musical piece data M. More specifically, the musical piece data M is time series data in which instruction data representing performance contents and time data representing the generation time points of the instruction data are arranged. The instruction data instructs pitch (note number) and intensity (velocity), thereby instructing various kinds of events, such as sound generation and sound silencing. Time data specifies, for example, the interval (delta time) of instruction data arranged sequentially.

The automatic performance device 24 shown in FIG. 1 carries out the automatic performance of the target musical piece under the control of the control device 12. More specifically, one of a plurality of performance parts constituting the target musical piece, different from the performance parts (for example, the performance parts of stringed musical instruments) of the plurality of performers P is automatically performed by the automatic performance device 24. The automatic performance device 24 according to the embodiment is a keyboard musical instrument (i.e., an automatic performance piano) equipped with a drive mechanism 242 and a sound-generating mechanism 244. The sound-generating mechanism 244 is a string-striking mechanism that strikes a string (i.e., a sounding body) to generate sound in synchronization with the displacement of each key on the keyboard, as in the case of a natural keyboard musical instrument, such as a piano. More specifically, the sound-generating mechanism 244 includes, for each key, an action mechanism composed of a hammer capable of striking a string and a plurality of transmission members (for example, a whippen, a jack and a repetition lever) for transmitting the displacement of the key to the hammer. The drive mechanism 242 drives the sound-generating mechanism 244, thereby carrying out the automatic performance of the target musical piece. More specifically, the drive mechanism 242 is configured so as to include a plurality of driving units (for example, actuators, such as solenoids) for displacing the respective keys and drive circuits for driving the respective driving units. The drive mechanism 242 drives the sound-generating mechanism 244 according to instructions from the control device 12, whereby the automatic performance of the target musical piece is achieved. It is possible that the control device 12 or the storage device 14 is mounted on the automatic performance device 24.

The recording device 22 records the way how the plurality of performers P carries out the performance of the target musical piece. As exemplified in FIG. 1, the recording device 22 according to the embodiment includes a plurality of imaging devices 222 and a plurality of sound-collecting devices 224. The imaging device 222 is installed for each performer P and generates an image signal V0 by imaging the performer P. The image signal V0 is a signal representing the moving image of the performer P. The sound-collecting device 224 is installed for each performer P and collects sound (for example, musical sound or singing voice) generated by the performance of a musical instrument carried out by the performer P and generates an acoustic signal A0. The acoustic signal A0 is a signal representing the waveform of sound. As understood from the explanation described above, the recording device 22 records a plurality of image signals V0 obtained by imaging different performers P and a plurality of acoustic signals A0 obtained by collecting the sounds of the performance carried out by the different performers P. An acoustic signal A0 to be output from an electric musical instrument, such as an electric string musical instrument, can also be used. Hence, the sound-collecting devices 224 can be omitted.

The control device 12 executes the programs stored in the storage device 14, thereby achieving a plurality of functions (a sign detector 52, a performance analyzer 54, a performance controller 56 and a display controller 58) for achieving the automatic performance of the target musical piece. It is possible to adopt a configuration in which the functions of the control device 12 are achieved by using a set (i.e., a system) of a plurality of devices or a configuration in which some or all of the functions of the control device 12 are achieved by using dedicated electronic circuits. Furthermore, a server device located away from a space, such as an acoustic hall, in which the recording device 22, the automatic performance device 24 and the display device 26 are installed, can achieve some or all of the functions of the control device 12.

Figure 2:
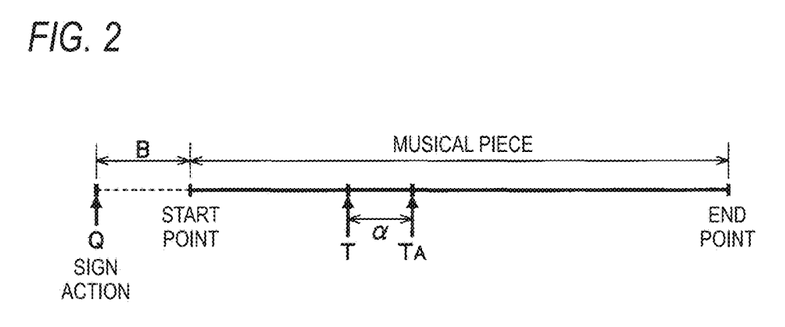
FIG. 2 is a view explaining a sign action and a performance position.

Each performer P carries out an action (hereafter referred to as "sign action") serving as the sign for the performance of the target musical piece. The sign action is an action (gesture) instructing a single time point on a time axis. For example, the action of lifting the musical instrument of the performer P or the action of moving the body of the performer P is a good example of the sign action. For example, the specific performer P leading the performance of the target musical piece carries out the sign action at a time point Q earlier by a predetermined period (hereafter referred to as "preparation period") B than the start point where the performance of the target musical piece should be started, as shown in FIG. 2. The preparation period B is, for example, the period of a time length corresponding to one measure of the target musical piece. Hence, the time length of the preparation period B varies depending on the performance speed (tempo) of the target musical piece. For example, the preparation period B is shorter as the performance speed is higher. At the performance speed assumed for the target musical piece, the performer P carries out the sign action at the time point earlier by the preparation period B corresponding to one measure than the start point of the target musical piece, and then starts the performance of the target musical piece when the start point is reached. The sign action is used as the trigger for the performance by the other performers P and is also used as the trigger for the automatic performance by the automatic performance device 24. The time length of the preparation period B is arbitrary, and the time length may be set to a plurality of measures, for example.

Figure 3:
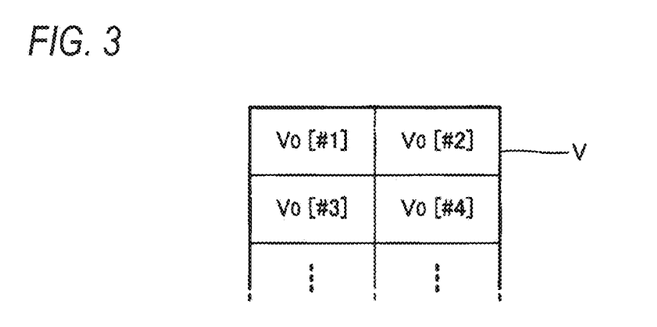
FIG. 3 is a view explaining image synthesis using an image synthesizer.
Figure 9:
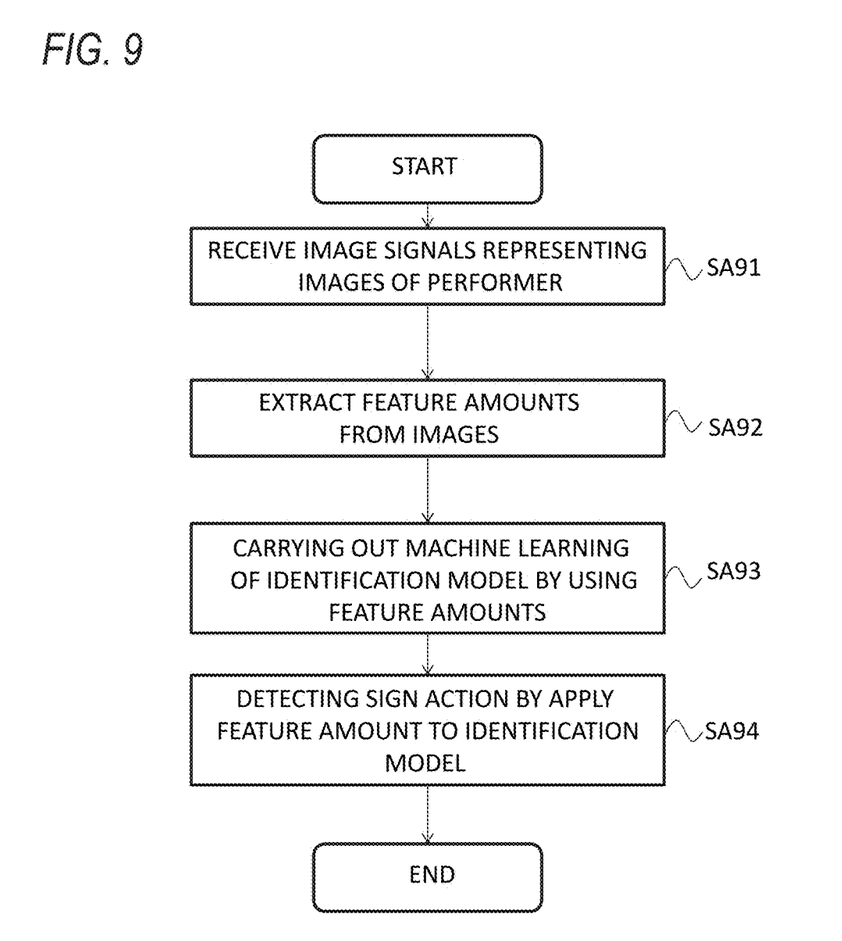
FIG. 9 is a flow chart explaining a detection processing of a sign detector.

Here, a detection processing of the sign detector 52 is explained by using FIG. 9. FIG. 9 is a flow chart exemplifying the detection processing of the detection processor 524 of the sign detector 52. The sign detector 52 shown in FIG. 1 detects the sign action carried out by the performer P. More specifically, the sign detector 52 analyzes the image of the performer P imaged by each imaging device 222, thereby detecting the sign action. As exemplified in FIG. 1, the sign detector 52 according to the embodiment includes an image synthesizer 522 and a detection processor 524. The image synthesizer 522 synthesizes the plurality of image signals V0 generated by the plurality of imaging devices 222, thereby generating an image signal V. The image signal V is a signal representing an image composed of a plurality of moving images (#1, #2, #3, . . . ) that are represented by the respective image signals V0 and arranged as exemplified in FIG. 3. In other words, the image signal V representing the moving images of the plurality of performers P is supplied from the image synthesizer 522 to the detection processor 524 (SA91).

The detection processor 524 analyzes the image signal V generated by the image synthesizer 522, thereby detecting the sign action carried out by any one of the plurality of performers P. A known image analysis technology including image recognition processing for extracting images of elements (for example, the body of the performer and the musical instrument) that are moved when the performer P carries out the sign action and moving body detection processing for detecting the movement of the elements can be used for the detection of the sign action by the detection processor 524 (SA92). Furthermore, an identification model, such as a neural network or a multiple tree, can also be used for the detection of the sign action. For example, machine learning (for example, deep learning) of an identification model is carried out in advance by using the feature amounts extracted from the image signals obtained by imaging the performance carried out by the plurality of performers P as given learning data (SA93). The detection processor 524 detects the sign action by applying the feature amounts extracted from the image signal V obtained at a scene where automatic performance is actually carried out to the identification model obtained after the machine learning (SA94).

The performance analyzer 54 shown in FIG. 1 sequentially estimates the position (hereafter referred to as "performance position") T in the target musical piece being currently performed by the plurality of performers P in parallel with the performance of the respective performers P. More specifically, the performance analyzer 54 analyzes the sound recorded by each of the plurality of sound-collecting devices 224, thereby estimating the performance position T. As exemplified in FIG. 1, the performance analyzer 54 according to the embodiment includes an acoustic mixer 542 and an analysis processor 544. The acoustic mixer 542 generates an acoustic signal A by mixing the plurality of acoustic signals A0 generated by the plurality of sound-collecting devices 224. In other words, the acoustic signal A is a signal representing the mixed sound of the plurality of kinds of sounds represented by different acoustic signals A0.

The analysis processor 544 estimates the performance position T by analyzing the acoustic signal A generated by the acoustic mixer 542. For example, the analysis processor 544 specifies the performance position T by collating the sound represented by the acoustic signal A with the performance contents of the target musical piece represented by the musical piece data M. Furthermore, the analysis processor 544 according to the embodiment estimates the performance speed (tempo) R of the target musical piece by analyzing the acoustic signal A. For example, the analysis processor 544 specifies the performance speed R according to the temporal change of the performance position T. A known acoustic analysis technology (score alignment) can be adopted arbitrarily for the estimation of the performance position T and the performance speed R by the analysis processor 544. For example, the analysis technology disclosed in JP-A-2015-79183 can be used to estimate the performance position T and the performance speed R. Furthermore, an identification model, such as a neural network or a multiple tree, can also be used for the estimation of the performance position T and the performance speed R. For example, machine learning (for example, deep learning) of an identification model is carried out in advance by using, as given learning data, the feature amounts extracted from the acoustic signal A obtained by collecting the sounds of the performance by the plurality of performers P. The analysis processor 544 estimates the performance position T and the performance speed R by applying the feature amounts extracted from the acoustic signal A obtained at a scene where automatic performance is actually carried out to the identification model obtained after the machine learning.

The detection of the sign action by the sign detector 52 and the estimation of the performance position T and the performance speed R by the performance analyzer 54 are carried out in real time in parallel with the performance of the target musical piece by the plurality of performers P. For example, the detection of the sign action and the estimation of the performance position T and the performance speed R are repeated at a predetermined cycle. However, it does not matter whether the detection cycle of the sign action is identical with or different from the estimation cycle of the performance position T and the performance speed R.

The performance controller 56 shown in FIG. 1 causes the automatic performance device 24 to carry out the automatic performance of the target musical piece so as to be synchronized with the sign action detected by the sign detector 52 and the progress of the performance position T estimated by the performance analyzer 54. More specifically, the performance controller 56 instructs the automatic performance device 24 to start the automatic performance by using the detection of the sign action by the sign detector 52 as a trigger, and gives instructions to the automatic performance device 24 by supplying the performance contents of the target musical piece designated by the musical piece data M at the time point corresponding to the performance position T. In other words, the performance controller 56 is a sequencer for sequentially supplying the respective instruction data included in the musical piece data M of the target musical piece to the automatic performance device 24. The automatic performance device 24 carries out the automatic performance of the target musical piece according to the instructions from the performance controller 56. As the performance by the plurality of performers P progresses, the performance position T moves to the latter part in the target musical piece. Hence, the automatic performance of the target musical piece by the automatic performance device 24 also progresses together with the movement of the performance position T. As understood from the explanation described above, while the intensity of each sound or the musical expression, such as phrase expression, of the target musical piece is maintained as specified in the contents designated by the musical piece data M, the performance controller 56 instructs the automatic performance device 24 to carry out the automatic performance so that the tempo of the performance and the timing of each sound are synchronized with the performance by the plurality of performers P (in other words, changed from the contents designated by the musical piece data M). Hence, for example, in the case that the musical piece data M representing the performance of a specific performer (for example, a performer in the past, not alive at present) is used, while the musical expression unique to the specific performer is reproduced faithfully by the automatic performance, it is possible to create an atmosphere as if the specific performer and the plurality of real performers P are carrying out performance in concert cooperatively in harmony.

However, a time of approximately several hundreds of milliseconds is required from the time when the performance controller 56 outputs the instruction data and instructs the automatic performance device 24 to carry out automatic performance to the time when the automatic performance device 24 actually generates sound (for example, the hammer of the sound-generating mechanism 244 strikes the string). In other words, the actual sound generation by the automatic performance device 24 is delayed inevitably with respect to the instruction from the performance controller 56. As a result, in the configuration in which the performance controller 56 instructs the automatic performance device 24 to carry out the performance of the performance position T in the target musical piece estimated by the performance analyzer 54, the sound generation by the automatic performance device 24 is delayed with respect to the performance by the plurality of performers P.

To solve this problem, the performance controller 56 according to the embodiment instructs the automatic performance device 24 to carry out the performance to be carried out at a time point TA later (in the future) than the performance position T in the target musical piece estimated by the performance analyzer 54. In other words, the performance controller 56 preliminarily reads the instruction data in the musical piece data of the target musical piece so that the delayed sound generation is synchronized with the performance by the plurality of performers P (for example, so that the specific musical note of the target musical piece is played by the automatic performance device 24 and the respective performers P almost simultaneously).

Figure 4:
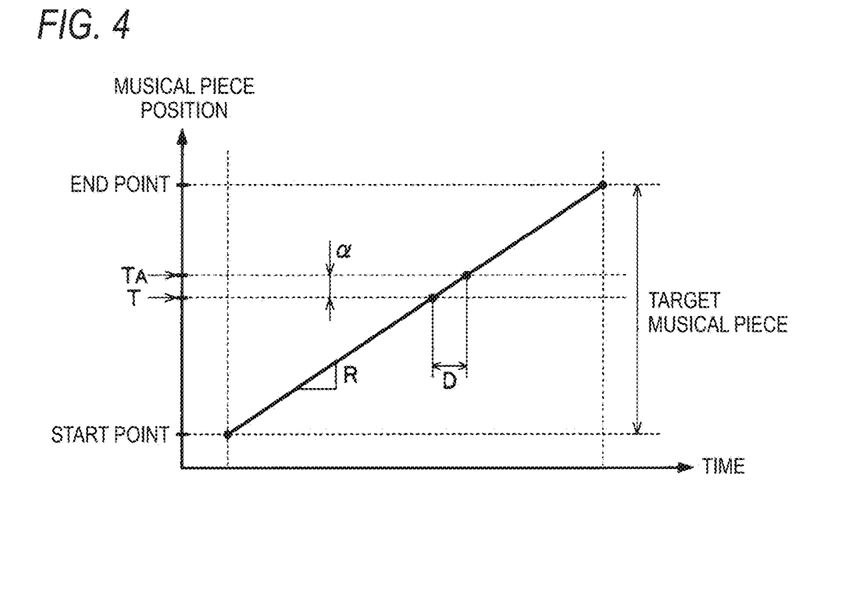
FIG. 4 is a view explaining the relationship between the performance position of a target musical piece and the instruction position of automatic performance.

FIG. 4 is an explanatory view showing the change of the performance position T with time. The variation amount (the inclination of the straight line in FIG. 4) of the performance position T per unit time corresponds to the performance speed R. For the sake of convenience, FIG. 4 exemplifies a case in which the performance speed R is maintained constant.

As exemplified in FIG. 4, the performance controller 56 instructs the automatic performance device 24 to carry out the performance to be carried out at the time point TA later, by an adjustment amount α, than the performance position T in the target musical piece. The adjustment amount α is set so as to be variable depending on the delay amount D from the instruction of the automatic performance by the performance controller 56 to the actual sound generation by the automatic performance device 24 and the performance speed R estimated by the performance analyzer 54. More specifically, the length of a section in which the performance of the target musical piece progresses within the time of the delay amount D at the performance speed R is set as the adjustment amount α by the performance controller 56. Hence, the adjustment amount α is larger as the performance speed R is higher (the inclination of the straight line in FIG. 4 is steeper). Although the case in which the performance speed R is maintained constant in all the sections of the target musical piece is assumed in FIG. 4, the performance speed R is variable in actuality. Consequently, the adjustment amount α varies with time in synchronization with the performance speed R.

The delay amount D is preliminarily set to a predetermined value (for example, approximately several tens to several hundreds of milliseconds) depending on the measurement results of the automatic performance device 24. In the actual automatic performance device 24, however, the delay amount D may become different depending on the pitch or intensity of the sound to be played. Hence, it is possible that the delay amount D (and also the adjustment amount α being dependent on the delay amount D) can be set so as to be variable depending on the pitch or intensity of the musical note to be played automatically.

Figure 5:
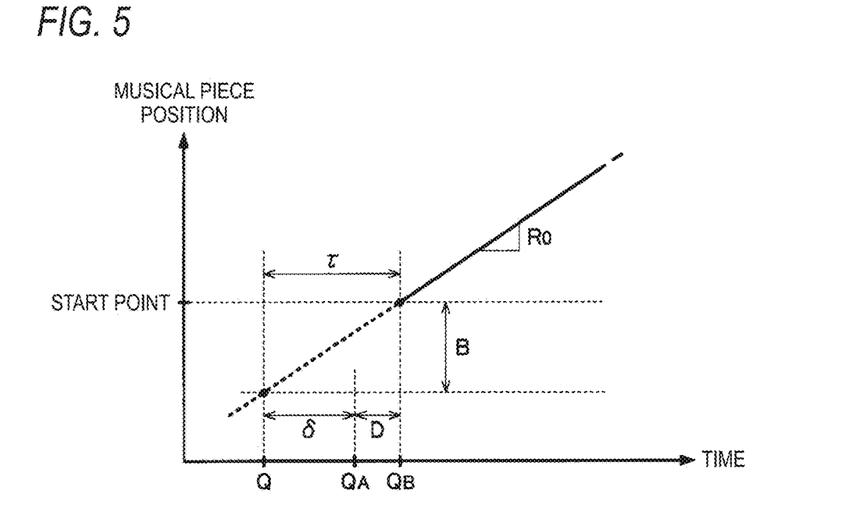
FIG. 5 is a view explaining the relationship between the position of the sign action and the start point of the performance of the target musical piece.

Furthermore, the performance controller 56 instructs the automatic performance device 24 to start the automatic performance of the target musical piece by using the sign action detected by the sign detector 52 as a trigger. FIG. 5 is an explanatory view showing the relationship between the sign action and the automatic performance. As exemplified in FIG. 5, the performance controller 56 instructs the automatic performance device 24 to start the automatic performance at a time point QA after the elapse of a time length δ from the time point Q at which the sign action was detected. The time length δ is the time length obtained by subtracting the delay amount D of the automatic performance from a time length T corresponding to the preparation period B. The time length T of the preparation period B varies depending on the performance speed R of the target musical piece. More specifically, the time length T of the preparation period B becomes shorter as the performance speed R is higher (the inclination of the straight line in FIG. 5 is steeper). However, since the performance of the target musical piece is not yet started at the time point Q of the sign action, the performance speed R is not estimated. Hence, the performance controller 56 calculates the time length T of the preparation period B depending on the standard performance speed (standard tempo) R0 that is assumed for the target musical piece. The performance speed R0 is designated, for example, by the musical piece data M. However, it is possible that the speed (for example, the speed assumed at the time of performance practice) commonly recognized for the target musical piece by the plurality of performers P can be set as the performance speed R0.

As explained above, the performance controller 56 instructs the automatic performance device 24 to start the automatic performance at the time point QA after the elapse of the time length δ (δ=τ−D) from the time point Q of the sign action. Hence, the sound generation by the automatic performance device 24 is started at a time point QB (i.e., the time point when the plurality of performers P starts performance) after the elapse of the preparation period B from the time point Q of the sign action. In other words, the automatic performance by the automatic performance device 24 is started almost simultaneously with the start of the performance by the plurality of performers P. The automatic performance controlled by the performance controller 56 according to the embodiment is as exemplified below.

The display controller 58 shown in FIG. 1 displays an image (hereafter referred to as "performance image") G visually representing the progress of the automatic performance by the automatic performance device 24. More specifically, the display controller 58 generates image data representing the performance image G and outputs the image data to the display device 26, thereby displaying the performance image G on the display device 26. The display device 26 displays the performance image G that is instructed by the display controller 58. For example, a liquid crystal display panel or a projector is taken as a good example of the display device 26. The plurality of performers P can visually recognize the performance image G displayed by the display device 26 at any time in parallel with the performance of the target musical piece.

Figure 6:
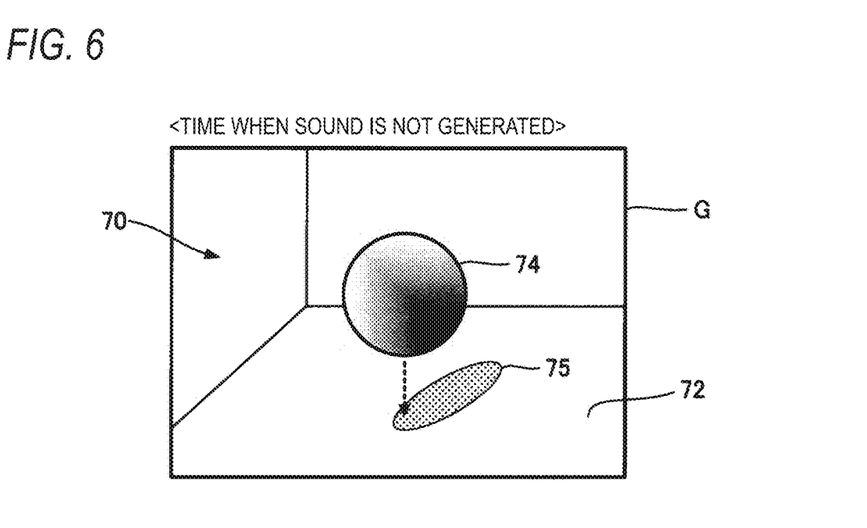
FIG. 6 is a view explaining a performance image.
Figure 7:
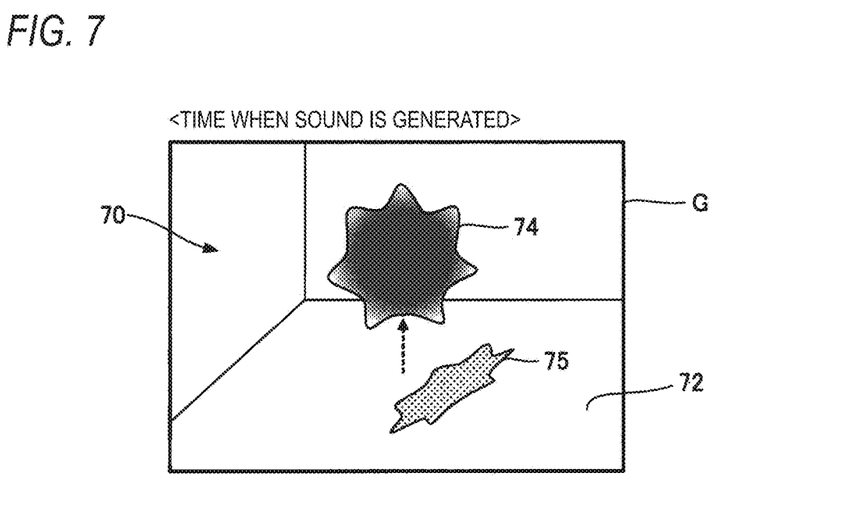
FIG. 7 is another view explaining the performance image.

The display controller 58 according to the embodiment displays the moving image dynamically changing in synchronization with the automatic performance by the automatic performance device 24 on the display device 26 as the performance image G. FIGS. 6 and 7 are display examples of the performance image G. As exemplified in FIGS. 6 and 7, the performance image G is a stereoscopic image in which a display body (object) 74 is disposed in a virtual space 70 having a bottom face 72. As exemplified in FIG. 6, the display body 74 is a nearly spherical stereoscopic object floating inside the virtual space 70 and moving downward at a predetermined speed. The shadow 75 of the display body 74 is displayed on the bottom face 72 of the virtual space 70 and approaches the display body 74 along the bottom face 72 as the display body 74 moves downward. As exemplified in FIG. 7, at the time point when the sound generation by the automatic performance device 24 is started, the display body 74 moves upward to a predetermined height inside the virtual space 70, and the shape of the display body 74 changes irregularly while the sound generation continues. After that, when the sound generation by the automatic performance is stopped (silenced), the shape of the display body 74 stops changing irregularly and returns to its initial shape (spherical shape) shown in FIG. 6, and the display body 74 is shifted to the state of moving downward at the predetermined speed. At each time of the sound generation by the automatic performance, the above-mentioned actions (upward movement and deformation) of the display body 74 are repeated. For example, the display body 74 moves downward before the start of the performance of the target musical piece, and the movement direction of the display body 74 is changed from downward to upward at the time point when the sound of the note at the start point of the target musical piece is generated by the automatic performance. Hence, the performers P visually recognizing the performance image G displayed on the display device 26 can grasp the timing of the sound generation by the automatic performance device 24 according to the change in the movement direction of the display body 74 from downward to upward.

The display controller 58 according to the embodiment controls the display device 26 so that the performance image G exemplified above is displayed. The delay from the instruction of the display and change of the image given to the display device 26 by the display controller 58 to the reflection of the instruction to the display image is sufficiently smaller than the delay amount D of the automatic performance by the automatic performance device 24. Hence, the display controller 58 displays, on the display device 26, the performance image G corresponding to the performance contents at the performance position T in the target musical piece estimated by the performance analyzer 54. Consequently, as described above, the performance image G changes dynamically in synchronization with the actual sound generation by the automatic performance device 24 (at the time point delayed by the delay amount D from the instruction by the performance controller 56). In other words, at the time point when the automatic performance device 24 actually starts the sound generation of each note of the target musical piece, the movement direction of the display body 74 of the performance image G is changed from downward to upward. As a result, each performer P can visually recognize the time point when the automatic performance device 24 generates the sound of each note of the target musical piece.

Figure 8:
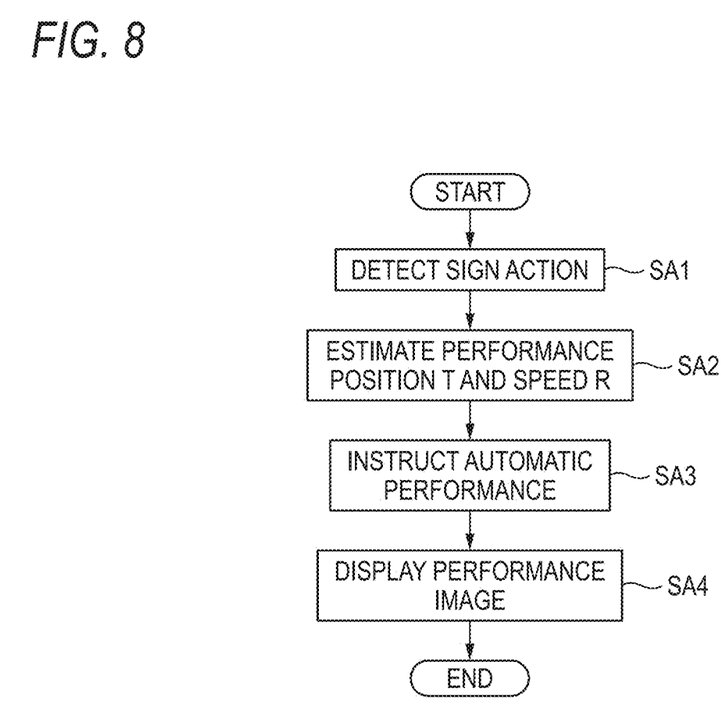
FIG. 8 is a flow chart showing the operation of a control device.

FIG. 8 is a flow chart exemplifying the operation of the control device 12 of the automatic performance system 100. In parallel with the performance of the target musical piece by the plurality of performers P, the processing shown in FIG. 8 is started, for example, by using an interruption signal generated at a predetermined cycle as a trigger. When the processing shown in FIG. 8 is started, the control device 12 (the sign detector 52) analyzes the plurality of image signals V0 supplied from the plurality of imaging devices 222, thereby judging whether the sign action by any one of performers P is present (at SA1). Furthermore, the control device 12 (the performance analyzer 54) estimates the performance position T and the performance speed R by analyzing the plurality of acoustic signals A0 supplied from the plurality of sound-collecting devices 224 (at SA2). The processing order of the detection of the sign action (at SA1) and the estimation of the performance position T and the performance speed R (at SA2) can be reversed.

The control device 12 (the performance controller 56) instructs the automatic performance device 24 to carry out the automatic performance according to the performance position T and the performance speed R (at SA3). More specifically, the control device 12 causes the automatic performance device 24 to carry out the automatic performance of the target musical piece so that the automatic performance is synchronized with the sign action detected by the sign detector 52 and the progress of the performance position T estimated by the performance analyzer 54. Furthermore, the control device 12 (the display controller 58) causes the display device 26 to display the performance image G representing the progress of the automatic performance (at SA4).

With the embodiment exemplified above, while the automatic performance by the automatic performance device 24 is carried out so as to be synchronized with the sign action by the performer P and the progress of the performance position T, the performance image G representing the progress of the automatic performance by the automatic performance device 24 is displayed on the display device 26. Hence, the progress of the automatic performance by the automatic performance device 24 can be visually recognized by the performer P and can be reflected to the performance of the performer P. In other words, a natural ensemble is achieved in which the performance by the plurality of performers P and the automatic performance by the automatic performance device 24 interact with each other. In particular in the embodiment, since the performance image G dynamically changing according to the performance contents of the automatic performance is displayed on the display device 26, the embodiment is advantageous in that the performers P can grasp the progress of the automatic performance visually and intuitively.

Moreover, with the embodiment, the performance contents at the time point TA later in time than the performance position T estimated by the performance analyzer 54 are instructed to the automatic performance device 24. Hence, even in the case that the actual sound generation by the automatic performance device 24 is delayed with respect to the performance instruction by the performance controller 56, the performance by the performers P and the automatic performance can be synchronized with each other accurately. What's more, the performance at the time point TA later than the performance position T by the variable adjustment amount α corresponding to the performance speed R estimated by the performance analyzer 54 is instructed to the automatic performance device 24. Hence, for example, even in the case that the performance speed R varies, the performance by the performers P and the automatic performance can be synchronized with each other accurately.

<Modification>

The respective modes exemplified above can be modified variously. Specific modifications will be exemplified below. Two or more modes arbitrarily selected from the following examples can be combined appropriately in a range not mutually contradictory.

(1) Although the automatic performance of the target musical piece is started by using the sign action detected by the sign detector 52 as a trigger in the embodiment described above, the sign action can also be used to control the automatic performance at the time point in the middle of the target musical piece. For example, at the time point when the performance is resumed after the end of a long rest in the target musical piece, the automatic performance of the target musical piece is resumed by using the sign action as a trigger, as in the respective modes described above. For example, as in the operation explained referred to FIG. 5, a specific performer P carries out a sign action at the time point Q earlier, by the preparation period B, than the time point when the performance is resumed after the rest in the target musical piece. After that, at the time point after the elapse of the time length δ corresponding to the delay amount D and the performance speed R from the time point Q, the performance controller 56 instructs the automatic performance device 24 to resume the automatic performance. However, since the performance speed R has already been estimated at the time point in the middle of the target musical piece, the performance speed R estimated by the performance analyzer 54 is applied to the setting of the time length δ.

The period in the target musical piece in which the sign action can be carried out can be grasped in advance from the performance contents of the target musical piece. Hence, the sign detector 52 can monitor the presence or absence of the sign action in a specific period (hereafter referred to as "monitoring period") in the target musical piece in which the sign action can be carried out. For example, section designation data for designating the start point and the end point in each of a plurality of monitoring periods assumed to be included in the target musical piece is stored in the storage device 14. The section designation data can also be included in the musical piece data M. In the case that the performance position T in the target musical piece is present in each monitoring period designated by the section designation data, the sign detector 52 monitors the sign action. In the case that the performance position T is outside the monitoring period, the sign detector 52 stops monitoring the sign action. With the configuration described above, the sign action is detected only in the monitoring period in the target musical piece. Hence, this configuration is advantageous in that the processing load of the sign detector 52 is made lower than that in a configuration in which the presence or absence of the sign action is monitored in all the sections of the target musical piece. Furthermore, it is possible to reduce the possibility that the sign action is erroneously detected in the periods in the target musical piece in which the sign action cannot be carried out actually.

(2) Although the sign action is detected by analyzing the whole (FIG. 3) of the image represented by the image signal V in the embodiment described above, the sign detector 52 can monitor the presence or absence of the sign action in a specific region (hereafter referred to as "monitoring region") in the image represented by the image signal V. For example, the sign detector 52 selects, as a monitoring region, the range including the image of the specific performer P who is supposed to carry out the sign action in the image represented by the image signal V and then detects the sign action by using the monitoring region as a target. The ranges other than the monitoring region are excluded from the targets to be monitored. With the configuration described above, the sign action is detected only in the monitoring region. Hence, this configuration is advantageous in that the processing load of the sign detector 52 is made lower than that in a configuration in which the presence or absence of the sign action is monitored in all the regions of the image represented by the image signal V. Furthermore, it is possible to reduce the possibility that the action of the performer P who does not carrying out the sign action actually is erroneously judged as the sign action.

As exemplified in the modification (1) described above, when a case is assumed in which the sign action is carried out a plurality of times during the performance of the target musical piece, there is a possibility that the performer P who is supposed to carry out the sign action may be changed for each sign action. For example, while the sign action before the start of the target musical piece is carried out by a performer P1, the sign action in the middle of the target musical piece is carried out by a performer P2. It is thus preferable to use a configuration in which the position (or size) of the monitoring region in the image represented by the image signal V is changed with time. Since the performers P who are supposed to carry out the sign actions can be grasped in advance, the region designation data for designating the positions of the monitoring regions in tine series, for example, can be stored in the storage device 14 in advance. The sign detector 52 monitors the sign actions in the respective monitoring regions designated in the image represented by the image signal V by the range designation data, and the regions other than the monitoring regions are excluded from the targets for the sign actions to be monitored. With the configuration described above, even in the case that the performer P who is supposed to carry out the sign action is changed with the progress of the musical piece, the sign action can be detected appropriately.

(3) Although the plurality of performers P is imaged using the plurality of imaging devices 222 in the embodiment described above, it is possible that the plurality of performers P (for example, the plurality of performers P on the whole stage) can be imaged using a single imaging device 222. Similarly, the sounds performed by the plurality of performers P can be collected by a single sound-collecting device 224. Furthermore, it is possible to adopt a configuration in which the sign detector 52 monitors the presence or absence of the sign action in each of the plurality of image signals V0 (the image synthesizer 522 can thus be omitted).

(4) Although the sign action is detected by analyzing the image signal V obtained by synthesizing the image signals V0 generated by the imaging devices 222 in the embodiment described above, the method for detecting the sign action using the sign detector 52 is not limited to the method exemplified above. For example, the sign detector 52 can detect the sign action of the performer P by analyzing the detection signal of a detector (for example, a variety of sensors, such as an acceleration sensor) attached to the body of the performer P. However, the configuration of the embodiment described above in which the sign action is detected by analyzing the images imaged by the imaging devices 222 is advantageous in that the sign action can be detected while the influence to the performance action of the performer P is reduced, in comparison with the case in which the detector is attached to the body of the performer P.

(5) Although the performance position T and the performance speed R are estimated by analyzing the acoustic signal A obtained by mixing the plurality of acoustic signals A0 representing the sounds of different musical instruments in the embodiment described above, the performance position T and the performance speed R can be estimated by analyzing the respective acoustic signals A0. For example, the performance analyzer 54 estimates a provisional performance position T and a provisional performance speed R for each of the plurality of acoustic signals A0 by using a method similar to that of the embodiment described above and then determines a definite performance position T and a definite performance speed R according to the estimation results regarding the respective acoustic signals A0. For example, the typical values (for example, the average values) of the performance position T and the performance speed R estimated from the respective acoustic signals A0 are calculated as the definite performance position T and the definite performance speed R. As understood from the explanation described above, the acoustic mixer 542 of the performance analyzer 54 can be omitted.

(6) As exemplified in the embodiment described above, the automatic performance system 100 is achieved by the cooperation of the control device 12 and the programs. The programs according to a preferred mode of the present disclosure are used so that a computer is made to function as the sign detector 52 for detecting the sign action of the performer P performing the target musical piece, as the performance analyzer 54 for sequentially estimating the performance position T in the target musical piece by analyzing the acoustic signal A representing the performed sound in parallel with the performance of the sound, as the performance controller 56 for causing the automatic performance device 24 to carry out the automatic performance of the target musical piece so as to be synchronized with the sign action detected by the sign detector 52 and the progress of the performance position T estimated by the performance analyzer 54, and as the display controller 58 for displaying the performance image G representing the progress of the automatic performance on the display device 26. The programs exemplified above can be provided in the form stored on a computer-readable recording medium and can be installed in the computer. The recording medium is, for example, a non-transitory recording medium, and an optical recording medium (optical disc), such as a CD-ROM, is taken as a good example. However, the recording medium can include a known recording medium of an arbitrary form, such as a semiconductor recording medium or a magnetic recording medium. Furthermore, the programs can be distributed to the computer via a network as a distribution form.

(7) The preferred mode of the present disclosure is also specified as a method (automatic performance method) for operating the automatic performance system 100 according to the embodiment described above. For example, the automatic performance method according to the preferred mode of the present disclosure is characterized in that a computer system (a system composed of a single computer or a plurality of computers) executes the step of detecting the sign action of the performer P performing the target musical piece (at SA1), the step of sequentially estimating the performance position T in the target musical piece by analyzing the acoustic signal A representing performed sound in parallel with the performance (at SA2), the step of causing the automatic performance device 24 to carry out the automatic performance of the target musical piece so as to be synchronized with the sign action and the progress of the performance position T (at SA3), and the step of causing the display device 26 to display the performance image G representing the progress of the automatic performance (at SA4).

Here, the details of the above embodiments are summarized as follows.

[1] The disclosure provides an automatic performance system comprising:

a sign detector configured to detect a sign action of a performer performing a musical piece;

a performance analyzer configured to sequentially estimates a performance position in the musical piece by analyzing an acoustic signal representing performed sound in parallel with the performance; and a performance controller configured to control an automatic performance device to carry out an automatic performance of the musical piece so that the automatic performance is synchronized with the sign action detected by the sign detector and a progress of the performance position estimated by the performance analyzer.

[2] For example, the automatic performance system further comprising:

a display controller configured to control a display device to display an image representing the progress of the automatic performance.

By the above configurations, while the automatic performance by the automatic performance device is carried out so as to be synchronized with the sign action of the performer and the progress of the performance position, the image representing the progress of the automatic performance by the automatic performance device is displayed on the display device. Hence, the progress of the automatic performance by the automatic performance device can be visually recognized by the performer and can be reflected to the performance of the performer. In other words, a natural ensemble is achieved in which the performance by the performer and the automatic performance by the automatic performance device interact with each other.

[3] For example, the performance controller is configured to instruct the automatic performance device to carry out a performance of the musical piece at a time point later in time than the performance position estimated by the performance analyzer.

By the above configuration, the performance contents at the time point later in time than the performance position estimated by the performance analyzer are instructed to the automatic performance device. Hence, even in the case that the actual sound generation by the automatic performance device is delayed with respect to the performance instruction by the performance controller, the performance by the performer and the automatic performance can be synchronized with each other accurately.

[4] For example, the performance analyzer is configured to estimate performance speed by analyzing the acoustic signal, and the performance controller is configured to instruct the automatic performance device to carry out the performance to be carried out at a time point later in time, by an adjustment amount corresponding to the performance speed, than the performance position in the musical piece estimated by the performance analyzer.

By the above configuration, the performance at the time point later in time than the performance position by the variable adjustment amount corresponding to the performance speed estimated by the performance analyzer is instructed to the automatic performance device. Hence, for example, even in the case that the performance speed varies, the performance by the performer and the automatic performance can be synchronized with each other accurately.

[5] For example, the sign detector is configured to detect the sign action by analyzing an image of the performer imaged by an imaging device.

[6] For example, the sign detector is configured to detect the sign action by analyzing a detection signal output from a sensor which is attached to a body of the performer, the detection signal representing a movement of the body.

By the above configurations, since the sign action of the performer is detected by analyzing the image imaged by the imaging device, the embodiment is advantageous in that the sign action can be detected while the influence to the performance by the performer is reduced, in comparison with a case in which the sign action is detected by a detector attached to the body of the performer.

[7] For example, the display controller is configured to control the display device to display an image dynamically changing according to performance contents of the automatic performance.

[8] For example, the display controller is configured to control the display device to inform the performer of a timing of a sound generation in the automatic performance by a change in a movement direction of a display body in the image from downward to upward.

By the above configurations, since the image dynamically changing according to the performance contents of the automatic performance is displayed on the display device, the embodiment is advantageous in that the performer can grasp the progress of the automatic performance visually and intuitively.

[9] Also, there is an automatic performance method comprising:

detecting a sign action of a performer performing a musical piece;

sequentially estimating a performance position in the musical piece by analyzing an acoustic signal representing performed sound in parallel with the performance; and controlling an automatic performance device to carry out an automatic performance of the musical piece so that the automatic performance is synchronized with the sign action and a progress of the performance position.

[10] For example, the automatic performance method, further comprising:

controlling a display device to display an image representing the progress of the automatic performance.

[11] For example, the automatic performance device is instructed to carry out a performance of the musical piece at a time point later in time than the performance position.

[12] For example, the automatic performance method, further comprising:

estimating performance speed by analyzing the acoustic signal, wherein the automatic performance device is instructed to carry out the performance to be carried out at a time point later in time, by an adjustment amount corresponding to the performance speed, than the performance position in the musical piece estimated in the estimating step.

[13] For example, the sign action is detected in the detecting step by analyzing an image of the performer imaged by an imaging device.

[14] For example, the sign action is detected in the detecting step by analyzing a detection signal output from a sensor which is attached to a body of the performer, the detection signal representing a movement of the body.

[15] For example, the automatic performance method, further comprising:

controlling the display device to display an image dynamically changing according to performance contents of the automatic performance.

[16] For example, the display device is controlled to inform the performer of a timing of a sound generation in the automatic performance by a change in a movement direction of a display body in the image from downward to upward.

[17] Further, there is a sign action learning method performed by data processing apparatus, the sign action learning method comprising:

receiving image signals, each received image signal representing an image of a performer, imaged by an imaging device;

extracting feature amounts from the images in the image signals;

carrying out a machine learning of an identification model by using the feature amounts as learning data; and detecting a sign action of a performer actually performing a musical piece with automatic performance by applying a feature amount extracted from an image signal of the performer actually performing the musical piece imaged by the imaging device to the identification model obtained after the machine learning.

[18] For example, the feature amounts are elements which are moved when the performer carries out the sign action in the images of the imaging signals.

What is claimed is:

1. An automatic performance system for a collaborative performance of a musical piece by at least one performer and an automatic performance device, the automatic performance system comprising:

a controller, including at least one processor or circuit, configured to execute a plurality of tasks, including:

a sign action detecting task that detects a sign action of the at least one performer performing the musical piece based on a received detection signal;

a performance analyzing task that sequentially estimates a performance position in the musical piece based on a received acoustic signal representing a performed sound generated currently by the at least one performer; and a performance control task that controls the automatic performance device to execute an automatic performance of the musical piece while synchronizing with the sign action detected by the sign action detecting task and a progress of the performance position estimated by the performance analyzing task.

2. The automatic performance system according to claim 1, the plurality of task includes a display control task that controls a display device to display an image representing the progress of the automatic performance.

3. The automatic performance system according to claim 1, wherein the performance control task instructs the automatic performance device to execute the automatic performance of the musical piece at a time point later in time than the performance position estimated by the performance analyzing task.

4. The automatic performance system according to claim 3, wherein:

the performance analyzing task estimates a performance speed based on the received acoustic signal; and the performance control task instructs the automatic performance device to execute the automatic performance at a time point later in time, by an adjustment amount corresponding to the performance speed, than the performance position in the musical piece estimated by the performance analyzing task.

5. The automatic performance system according to claim 1, further comprising:
an imaging device that provides the received detecting signal representing an image of the at least one performer,
wherein the sign action detecting task detects the sign action by analyzing the image of the at least one performer imaged by the imaging device.

6. The automatic performance system according to claim 1, further comprising:
a sensor that outputs a detection signal representing a movement of the performer,
wherein the sign action detecting task detects the sign action by analyzing the detection signal output from the sensor which is attached to the at least one performer.

7. The automatic performance system according to claim 2, wherein the display control task controls the display device to display an image dynamically changing according to performance contents of the automatic performance.

8. The automatic performance system according to claim 7, wherein the display control task controls the display device to inform the at least one performer of a timing of a sound generation in the automatic performance by a change in a vertical movement direction of the at least one performer.

9. An automatic performance method for an automatic performance system for a collaborate performance of a musical piece by at least one performer and an automatic performance device, the method comprising:
a sign action detecting step of detecting a sign action of the at least one performer performing the musical piece based on a received detection signal;
a performance analyzing step of sequentially estimating a performance position in the musical piece based on a received acoustic signal representing a performed sound generated currently by the at least one performer; and
a performance controlling step of controlling the automatic performance device to execute an automatic performance of the musical piece while synchronizing with the sign action detected in the sign action detecting step and a progress of the performance position estimated in the performance analyzing step.

10. The automatic performance method according to claim 9, further comprising a display controlling step of controlling a display device to display an image representing the progress of the automatic performance.

11. The automatic performance method according to claim 9, wherein the performance control step instructs the automatic performance device to execute the automatic performance of the musical piece at a time point later in time than the performance position estimated in the performance analyzing step.

12. The automatic performance method according to claim 11, wherein:
the performance analyzing step estimates a performance speed based on the received acoustic signal,
the performance control step instructs the automatic performance device to execute the automatic performance at a time point later in time, by an adjustment amount corresponding to the performance speed, than the performance position in the musical piece estimated in the performance estimating step.

13. The automatic performance method according to claim 9, wherein the detection step detects the sign action by analyzing the received detecting signal representing an image of the at least one performer imaged by an imaging device.

14. The automatic performance method according to claim 9, wherein the sign action detecting step detects the sign action by analyzing the received detection signal representing a movement of the at least one performer output from a sensor, which is attached to the at least one performer.

15. The automatic performance method according to claim 10, the display control step controls the display device to display an image dynamically changing according to performance contents of the automatic performance.

16. The automatic performance method according to claim 15, wherein the display control task controls the display device to inform the at least one performer of a timing of a sound generation in the automatic performance by a change in a vertical movement direction of the at least one performer.

17. A sign action learning method performed by data processing apparatus, the sign action learning method comprising the steps of:
receiving image signals, representing images of a performer, imaged by an imaging device;
extracting feature amounts from the images in the image signals;
executing a machine learning of an identification model using the feature amounts extracted in the feature amount extracting step as learning data for identifying a sign action of a performer;
storing a plurality of identification models for identifying a plurality of sign actions of the performer learned in the machine learning executing step;
detecting a sign action of the performer currently performing a musical piece in accompaniment with an automatic performance performed by an automatic performance device based on the feature amounts currently extracted by the feature amount extracting step from an image signal of the performer currently performing the musical piece imaged by the imaging device and the plurality of identification models previously stored in the storing step.

18. The sign action learning method according to claim 17, wherein the feature amounts are elements that move when the at least one performer executes the sign action in the images of the imaging signals.

* * * * *